United States Patent
Croak et al.

(10) Patent No.: US 7,369,506 B1
(45) Date of Patent: May 6, 2008

(54) METHOD AND APPARATUS FOR ENABLING THE DETECTION OF TRANSPARENT DEFECTS

(75) Inventors: Marian Croak, Fair Haven, NJ (US); Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 491 days.

(21) Appl. No.: 11/049,383

(22) Filed: Feb. 2, 2005

(51) Int. Cl.
*G01R 31/08* (2006.01)
(52) U.S. Cl. ..................... 370/242; 370/247
(58) Field of Classification Search ............... None
See application file for complete search history.

(56) References Cited

U.S. PATENT DOCUMENTS

| | | | |
|---|---|---|---|
| 6,321,347 B1* | 11/2001 | Beeker et al. | 714/28 |
| 6,327,361 B1* | 12/2001 | Harshavardhana et al. | 379/230 |
| 6,570,855 B1* | 5/2003 | Kung et al. | 370/237 |
| 6,865,185 B1* | 3/2005 | Patel et al. | 370/412 |
| 7,133,365 B2* | 11/2006 | Klinker et al. | 370/238 |
| 2005/0195745 A1* | 9/2005 | Scott et al. | 370/241 |
| 2006/0028982 A1* | 2/2006 | Wright | 370/230 |

* cited by examiner

*Primary Examiner*—Phirin Sam

(57) ABSTRACT

The present invention enables the network to determine the true state of events that appear normal but produce service disruptions by periodically probing the status of all network elements and endpoints and comparing this status to historical graphs of the network. Events that deviate from a historical view will be alarmed to determine their true status.

10 Claims, 5 Drawing Sheets

METHOD AND APPARATUS FOR ENABLING THE DETECTION OF TRANSPARENT DEFECTS

The present invention relates generally to communication networks and, more particularly, to a method and apparatus for enabling the detection of transparent defects in packet switched networks, e.g., Voice over Internet Protocol (VoIP) networks.

BACKGROUND OF THE INVENTION

In communication networks, customer impacting disruptions sometimes occur. Most of these disruptions produce alarms that allow network operators to quickly restore service. Occasionally, however, defects in the network occur and are masked as normal events. For example sometimes the network fails to detect the active status of an endpoint connected to it and sends a call destined to that endpoint directly to voicemail. This event occurs because of a miscommunication between the endpoint and the network and not because the endpoint is truly unavailable. Since the network is temporarily blind to the true status of the endpoint, this type of event is treated as normal even though customers are impacted by not being able to receive calls.

Therefore, a need exists for a method and apparatus for enabling the detection of transparent defects in packet switched networks, e.g., VoIP networks.

SUMMARY OF THE INVENTION

In one embodiment, the present invention enables the network to determine the true state of events that appear normal but produce service disruptions by periodically probing the status of all network elements and endpoints and comparing this status to historical trends of the network. Events that deviate from a historical view will be alarmed to determine their true status. For example, a historical analysis may suggest that at a certain point during the day, 20% of endpoints should be unreachable and therefore subject to receiving voicemail, if a probe determines a fluctuation in the current data from this historical trend, network operators will be alerted so that they can further investigate the health of the network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
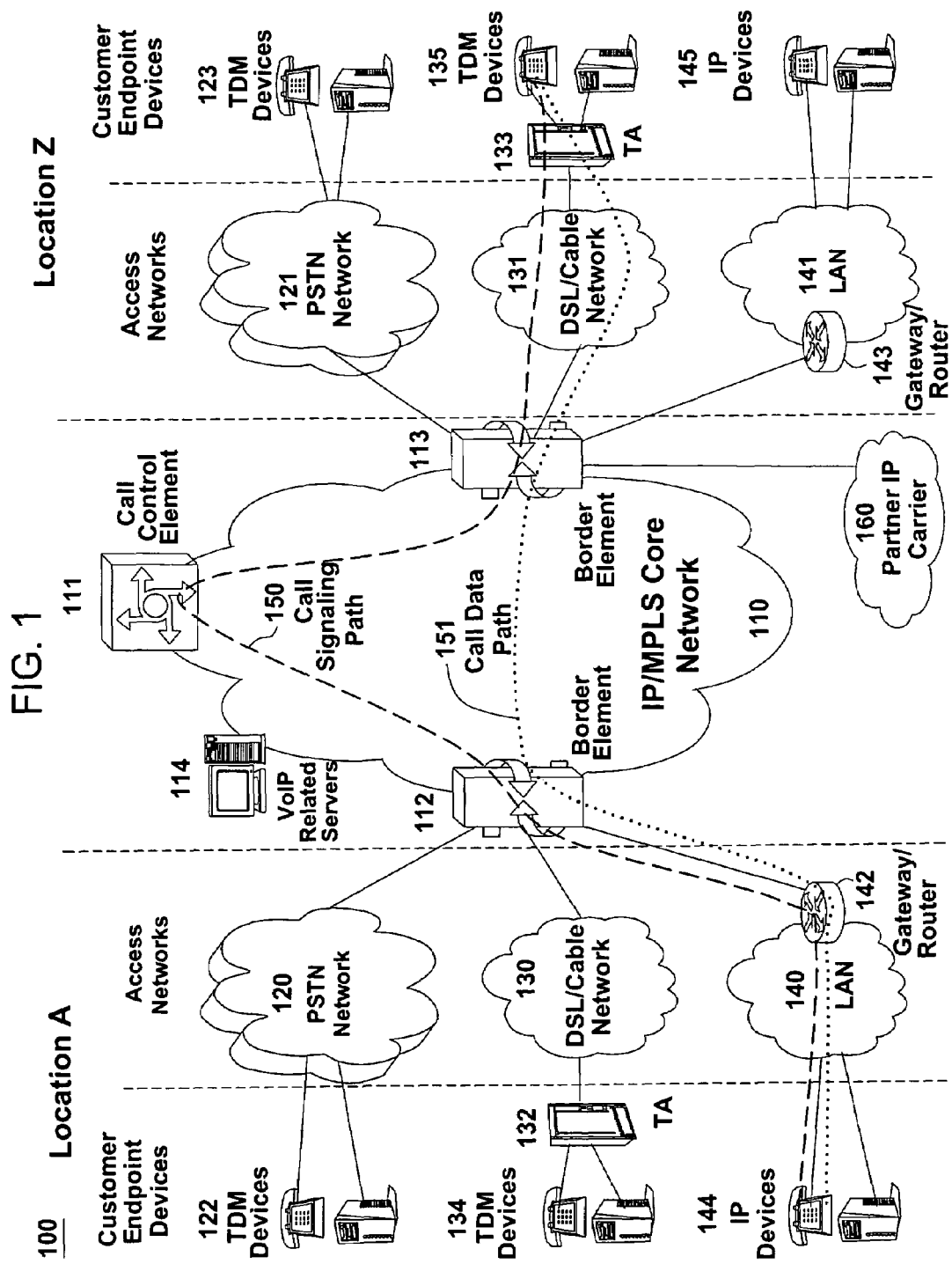
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

In VoIP networks customer impacting disruptions sometimes occur. Most of these disruptions produce alarms that allow network operators to quickly restore service. Occasionally, however, defects in the network occur and are masked as normal events. For example sometimes the network fails to detect the active status of an endpoint connected to it and sends a call destined to that endpoint directly to voicemail. This event occurs because of a miscommunication between the endpoint and the network and not because the endpoint is truly unavailable. Since the network is temporarily blind to the true status of the endpoint, this type of event is treated as normal even though customers are impacted by not being able to receive calls.

To address this criticality, the present invention enables the network to determine the true state of events that appear normal but produce service disruptions by periodically probing the status of all network elements and endpoints and comparing this status to historical graphs of the network. Events that deviate from a historical view will be alarmed to determine their true status. For example, a historical analysis may suggest that at a certain point during the day, 20% of endpoints should be unreachable and therefore subject to receiving voicemail, if a probe determines a fluctuation in the current data from this historical trend, network operators will be alerted so that they can further investigate the health of the network.

Figure 2:
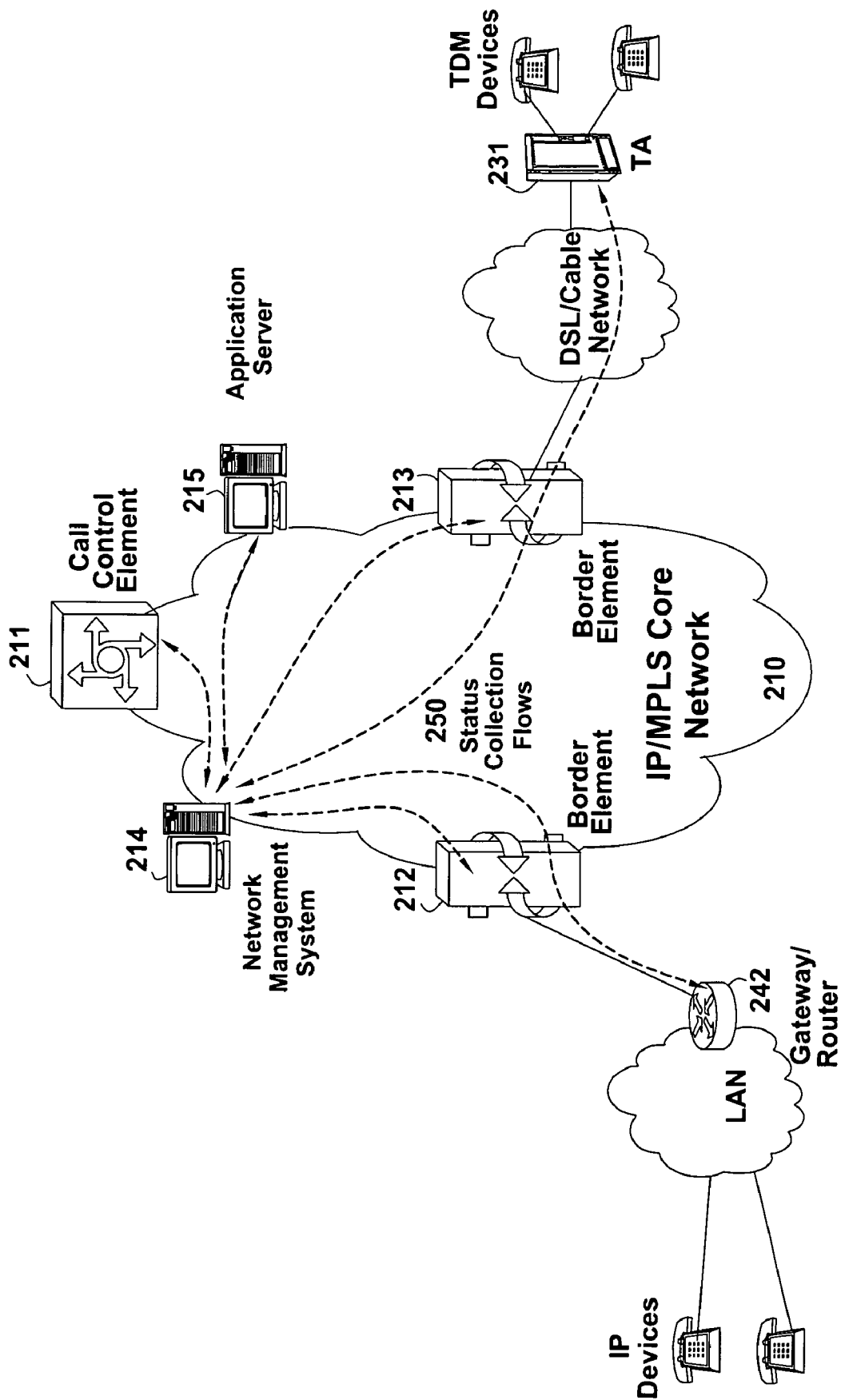
FIG. 2 illustrates an example of enabling the detection of transparent defects in a VoIP network of the present invention.

FIG. 2 illustrates an example of enabling the detection of transparent defects in a packet-switched network, e.g., a VoIP network. In FIG. 2, the Network Management System (NMS) 214 periodically probes all network elements and connected endpoint devices to collect call volumes and call flows status data, flow 250. Network elements include CCE 211, BEs 212, 213, VoIP related AS 215 and endpoint devices include customer VoIP gateway or router 242 and Terminal Adaptor 231. The length of the period of collection (e.g., a predefined collection period) is a configurable parameter predefined by the network provider and should be at least on a five minutes basis in one embodiment. Data collected within the current period will be used to create a historical trend data point. The collected historical trend data point will be stored for further analysis. When a period of historical data point is stored, the collection of historical data points will be repeated for the next period of time.

Once the current period of historical data point is stored, it can be used as a reference to compare against other previously collected historical data points. The previously collected historical data point to be compared include those from the previous five minutes, the same time period from the previous 24 hours, or the same time period from the previous week and it can be configured by the network provider for which one to use. When a significant difference is detected based on the comparisons, a transparent defect alarm will be raised to inform the network provider of the problems. For instance, a historical analysis may suggest that the same time period from the previous week, 20% of endpoints were unreachable and therefore subject to receiving voicemail. When the current historical trend data point shows that 40% of endpoints were unreachable, then the network operators will be alerted so that they can further investigate the health of the network. When the comparison of the current period of historical data is completed, the next period will be used as a reference point for the next comparison.

Figure 3:
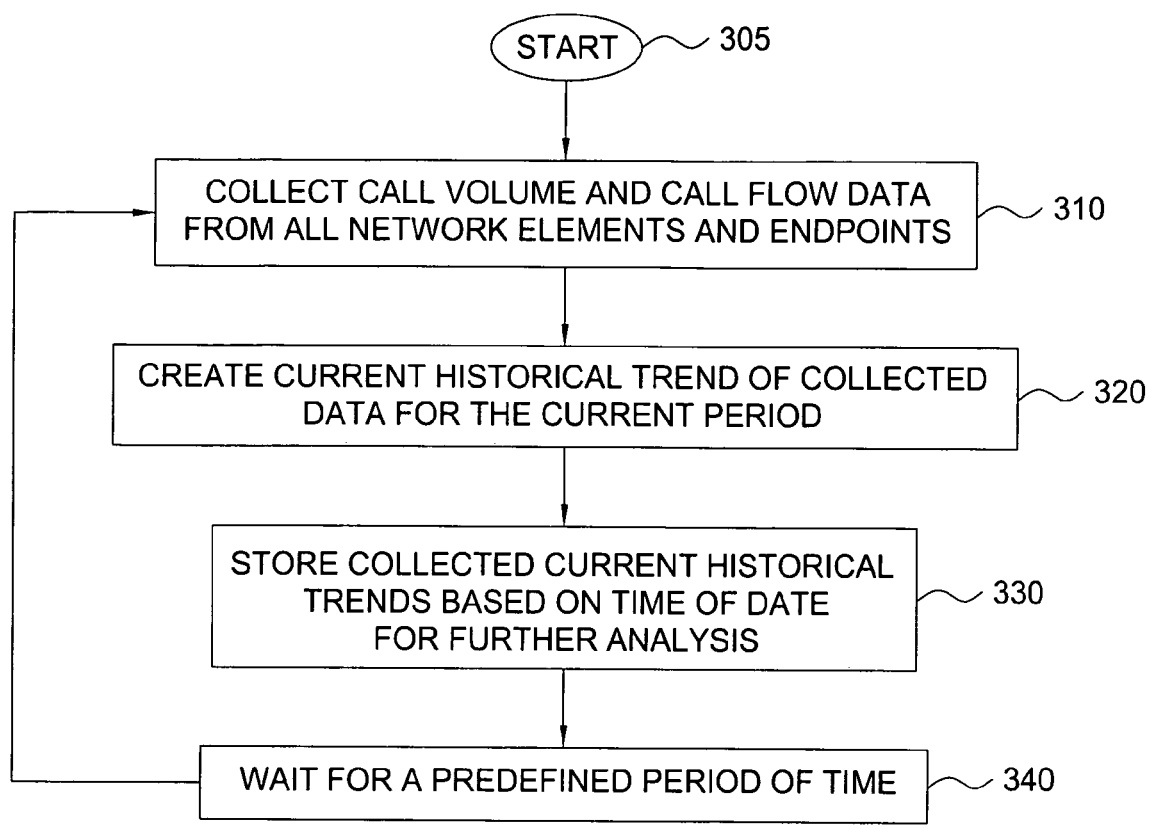
FIG. 3 illustrates a flowchart of a method for collecting historical trend data of call volumes and call flows in a VoIP network of the present invention.

FIG. 3 illustrates a flowchart of a method for collecting historical trend data of call volume and call flow by the NMS of a packet switched network, e.g., a VoIP network. Method 300 starts in step 305 and proceeds to step 310.

In step 310, the method collects call volume and call flow data from all network elements and connected endpoint devices from the VoIP network. The call volume measures the number of calls processed by the network and the call flow measures the type of calls, such as calls successfully completed, calls fail to be completed, and calls destined to voicemail, processed by the network. In step 320, the method creates a current historical trend data point using data collected within the current period. In step 330, the method stores the current historical data point for the current period based on time of date. In step 340, the method waits for the next period to begin and proceeds back to step 310.

Figure 4:
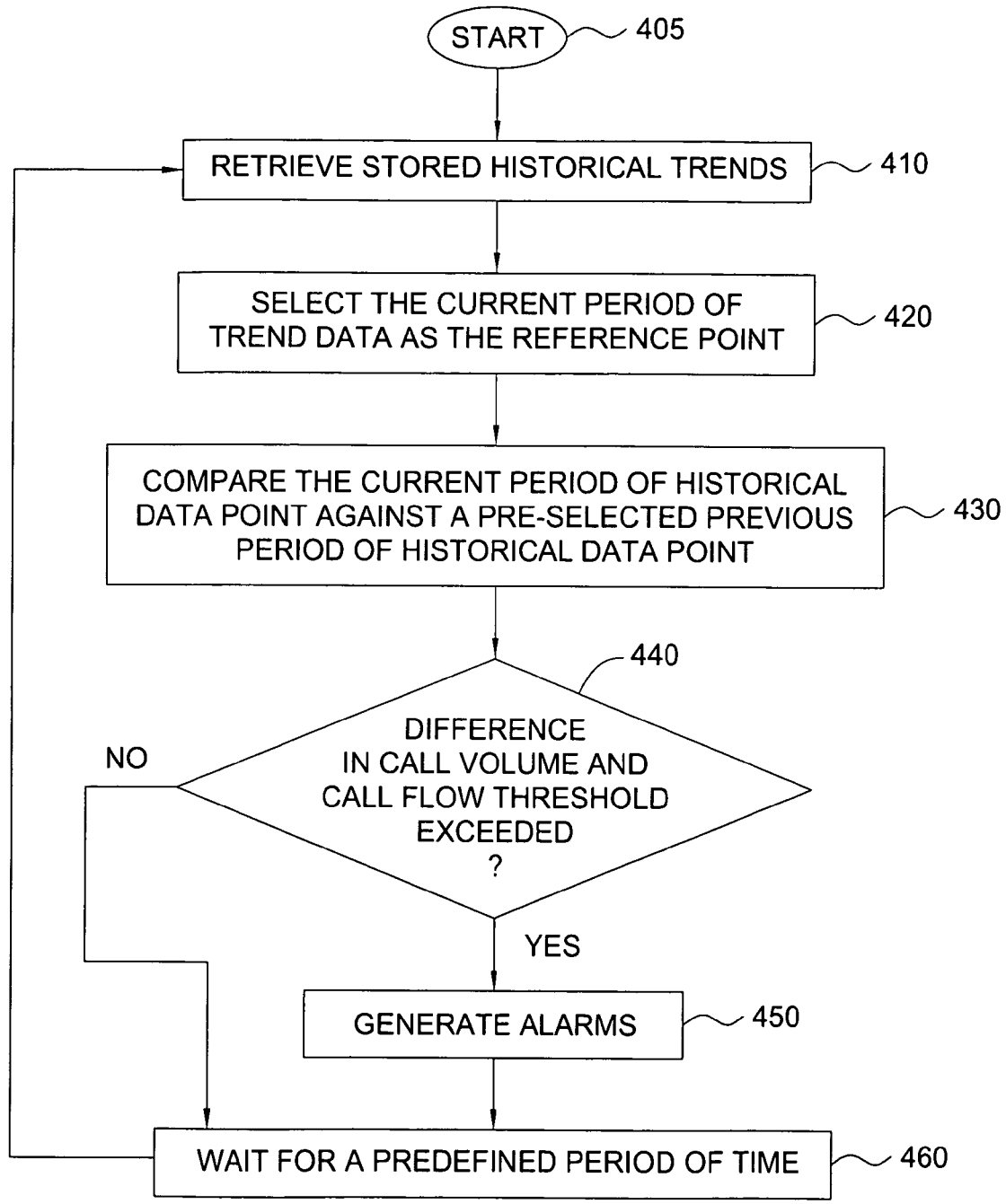
FIG. 4 illustrates a flowchart of a method for analyzing historical trend data of call volumes and call flows to detect transparent defects in a VoIP network of the present invention.

FIG. 4 illustrates a flowchart of a method for analyzing historical trend data of call volume and call flow by the NMS to detect transparent defects in a packet switched network, e.g., a VoIP network. Method 400 starts in step 405 and proceeds to step 410.

In step 410, the method retrieves stored historical data points for analysis. In step 420, the method selects the current period of historical data point as the reference point for comparison. In step 430, the method compares the current period historical data point against a pre-selected previous period of historical data point to produce difference data. In step 440, the method checks if there is significant differences between the current and the previous historical data points. If a call volume and call flow data trend difference exceeds a predefined threshold set by the network provider, then the method proceeds to step 450; otherwise, the method proceeds to step 460. In step 450, the method raises an alarm warning the network provider that an abnormal call volume and call flow trend has been detected. In step 460, the method waits for the next period to begin and proceeds back to step 410.

Figure 5:
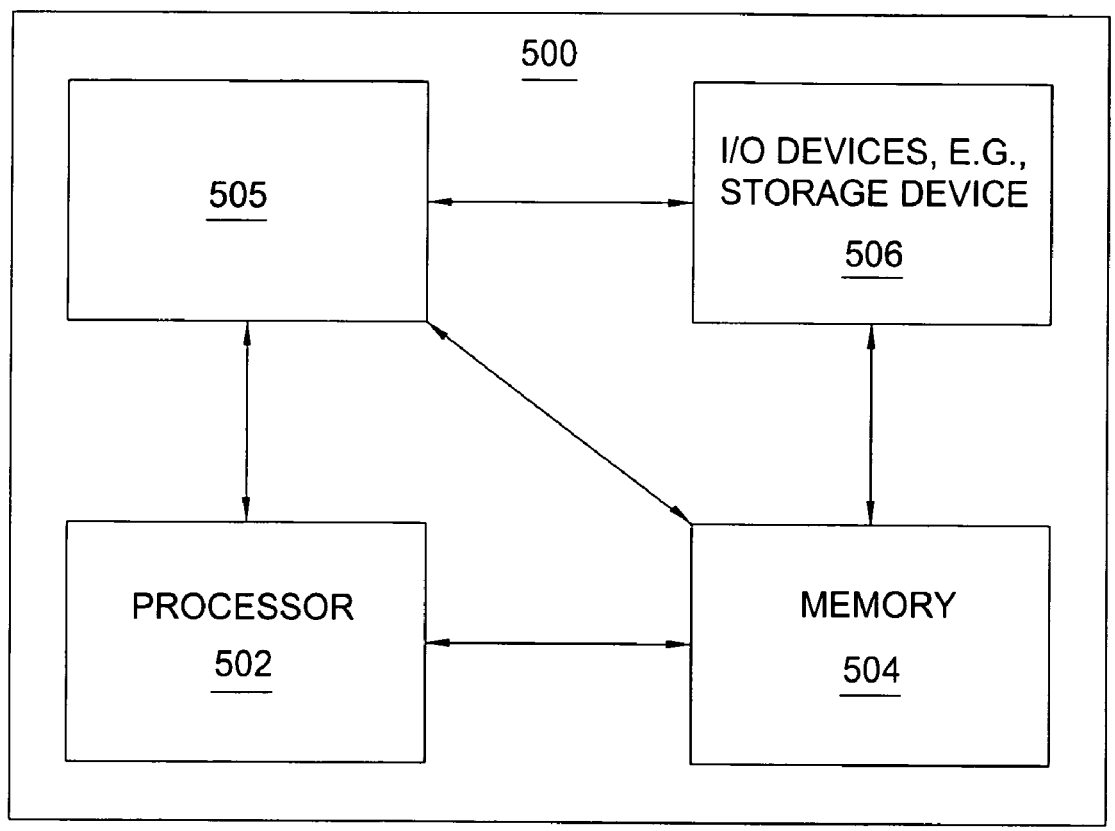
FIG. 5 illustrates a high level block diagram of a general purpose computer suitable for use in performing the functions described herein.

FIG. 5 depicts a high level block diagram of a general purpose computer suitable for use in performing the functions described herein. As depicted in FIG. 5, the system 500 comprises a processor element 502 (e.g., a CPU), a memory 504, e.g., random access memory (RAM) and/or read only memory (ROM), a detection of transparent defects module 505, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present detection of transparent defects module or process 505 can be loaded into memory 504 and executed by processor 502 to implement the functions as discussed above. As such, the present detection of transparent defects process 505 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting defects in a communication network, comprising:
    collecting data associated with at least one of: a call volume from a plurality of network elements and a call flow from a plurality of network elements, wherein said data is collected periodically for a predefined collection period, wherein a length of said collection period is at least on a five-minute basis;
    comparing a current period of data with at least one previous period of historical data to produce difference data; and
    raising an alarm if said difference data exceeds a predefined threshold.

2. A method for detecting defects in a communication network, comprising:
    collecting data associated with at least one of: a call volume from a plurality of network elements and a call flow from a plurality of network elements;
    comparing a current period of data with at least one previous period of historical data to produce difference data, wherein said at least one previous period comprises at least one of: a previous five minute period, a same period of a previous day, and a same period of a previous week; and
    raising an alarm if said difference data exceeds a predefined threshold.

3. A method for detecting defects in a communication network, comprising:
    collection data associated with at least one of: a call volume from a plurality of network elements and a call flow from a plurality of network elements, wherein said collecting comprises storing said data associated with at least one of: said call volume from said plurality of network elements and said call flow from said plurality of network elements based on time of date;
    comparing a current period of data with at least one previous period of historical data to produce difference data; and
    raising an alarm if said difference data exceeds a predefined threshold.

4. A method for detecting defects in a communication network, comprising:
    collecting data associated with at least one of: a call volume from a plurality of network elements and a call flow from a plurality of network elements, wherein said call volume is a measure of a number of calls processed by one of said plurality of network elements and, wherein said call flow is a measure of a type of calls processed by one of said plurality of network elements;
    comparing a current period of data with at least one previous period of historical data to produce difference data; and
    raising an alarm if said difference data exceeds a predefined threshold.

5. The method of claim 4, wherein said type of calls comprises at least one of: a successfully completed call, a call destined to a voicemail box, and a call that fails to be completed.

6. A computer-readable medium having stored thereon a plurality of instructions, the plurality of instructions including instructions which, when executed by a processor, cause the processor to perform the steps of a method for detecting defects in a communication network, comprising:
    collecting data associated with at least one of: a call volume from a plurality of network elements and a call flow from a plurality of network elements, wherein said data is collected periodically for a predefined collection period, wherein a length of said collection period is at least on a five-minute basis;
    comparing a current period of data with at least one previous period of historical data to produce difference data; and
    raising an alarm if said difference data exceeds a predefined threshold.

7. A computer-readable medium having stored thereon a plurality of instructions, the plurality of instructions including instructions which, when executed by a processor, cause the processor to perform the steps of a method for detecting defects in a communication network, comprising:

collecting data associated with at least one of: a call volume from a plurality of network elements and a call flow from a plurality of network elements;

comparing a current period of data with at least one previous period of historical data to produce difference data, wherein said at least one previous period comprises at least one of: a previous five minute period, a same period of a previous day, and a same period of a previous week; and raising an alarm if said difference data exceeds a predefined threshold.

8. A computer-readable medium having stored thereon a plurality of instructions, the plurality of instructions including instructions which, when executed by a processor, cause the processor to perform the steps of a method for detecting defects in a communication network, comprising:

collecting data associated with at least one of: a call volume from a plurality of network elements and a call flow from a plurality of network elements, wherein said collecting comprises storing said data associated with at least one of: said call volume from said plurality of network elements and said call flow from said plurality of network elements based on time of date;

comparing a current period of data with at least one previous period of historical data to produce difference data; and raising an alarm if said difference data exceeds a predefined threshold.

9. A computer-readable medium having stored thereon a plurality of instructions, the plurality of instructions including instructions which, when executed by a processor, cause the processor to perform the steps of a method for detecting defects in a communication network, comprising:

collecting data associated with at least one of: a call volume from a plurality of network elements and a call flow from a plurality of network elements, wherein said call volume is a measure of a number of calls processed by one of said plurality of network elements and, wherein said call flow is a measure of a type of calls processed by one of said plurality of network elements;

comparing a current period of data with at least one previous period of historical data to produce difference data; and raising an alarm if said difference data exceeds a predefined threshold.

10. The computer-readable medium of claim 9, wherein said type of calls comprises at least one of: a successfully completed call, a call destined to a voicemail box, and a call that fails to be completed.

* * * * *